US008209381B2

(12) United States Patent
Sinn et al.

(10) Patent No.: US 8,209,381 B2
(45) Date of Patent: Jun. 26, 2012

(54) DYNAMIC COMBATTING OF SPAM AND PHISHING ATTACKS

(75) Inventors: Richard Sinn, Milpitas, CA (US); Miles Libbey, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 727 days.

(21) Appl. No.: 11/625,193

(22) Filed: Jan. 19, 2007

(65) Prior Publication Data

US 2008/0177841 A1 Jul. 24, 2008

(51) Int. Cl.
*G06F 15/16* (2006.01)
*G06F 15/18* (2006.01)

(52) U.S. Cl. .......... 709/204; 709/201; 709/217; 706/12; 706/14

(58) Field of Classification Search .......... 709/204–207, 709/224; 706/15–16
See application file for complete search history.

(56) References Cited

U.S. PATENT DOCUMENTS

| 6,052,709 | A | 4/2000 | Paul |
| 6,304,864 | B1 * | 10/2001 | Liddy et al. ........... 707/E17.109 |
| 6,393,465 | B2 | 5/2002 | Leeds |
| 6,421,709 | B1 | 7/2002 | McCormick et al. |
| 6,453,327 | B1 | 9/2002 | Nielsen |
| 6,643,686 | B1 | 11/2003 | Hall |
| 6,650,890 | B1 | 11/2003 | Irlam et al. |
| 6,772,196 | B1 | 8/2004 | Kirsch et al. |
| 6,957,259 | B1 | 10/2005 | Malik |
| 7,287,057 | B2 * | 10/2007 | Lagarde et al. ............... 709/204 |
| 2003/0220972 | A1 * | 11/2003 | Montet et al. ................. 709/204 |
| 2004/0003041 | A1 * | 1/2004 | Moore et al. .................. 709/204 |
| 2004/0019637 | A1 * | 1/2004 | Goodman et al. ............. 709/204 |
| 2004/0019650 | A1 * | 1/2004 | Auvenshine ................... 709/206 |
| 2004/0030750 | A1 * | 2/2004 | Moore et al. .................. 709/204 |
| 2004/0117444 | A1 * | 6/2004 | Goodman et al. ............. 709/204 |
| 2004/0128353 | A1 * | 7/2004 | Goodman et al. ............. 709/204 |
| 2004/0177110 | A1 | 9/2004 | Rounthwaite et al. |
| 2004/0255122 | A1 | 12/2004 | Ingerman et al. |
| 2005/0050151 | A1 * | 3/2005 | Mitchell et al. ............... 709/204 |
| 2005/0138132 | A1 * | 6/2005 | Zhou et al. .................... 709/207 |
| 2005/0198131 | A1 * | 9/2005 | Appelman et al. ............ 709/204 |
| 2006/0004911 | A1 * | 1/2006 | Becker et al. ................. 709/207 |

(Continued)

OTHER PUBLICATIONS

U.S. International Searching Authority, Notification of Transmittal of the International Search Report and the Written Opinion of the International Searching Authority, or the Declaration, dated Jan. 31, 2006.

*Primary Examiner* — Ian N Moore
*Assistant Examiner* — Jenee Alexander
(74) *Attorney, Agent, or Firm* — Frommer Lawrence & Haug LLP; Jamie L. Wiegand

(57) ABSTRACT

A self training set of robots are configured to proactively search for selective communication abuses over a network. Robots may enter a chat room to proactively send messages. The robots then analyze patterns and/or content of a received message for potential abuse. Robots may also passively reside on/off line without publishing their network address. If a message is received, the message may be interpreted to be SPAM/SPIM. Robots may also perform a variety of other actions, such as access websites, and analyze received messages to determine if the messages indicate abuse. If abuse is detected, information may also be obtained to enable blocking or filtering of future messages from the sender, or access to/from an abusive website. The information also may be used to retrain robots, so that the robots may learn from and share their collective knowledge of abusive actions.

20 Claims, 9 Drawing Sheets

U.S. PATENT DOCUMENTS

| | | | |
|---|---|---|---|
| 2006/0031295 A1* | 2/2006 | Goodman et al. | 709/204 |
| 2006/0259555 A1* | 11/2006 | Hassounah et al. | 709/206 |
| 2007/0124270 A1* | 5/2007 | Page | 707/1 |
| 2007/0250566 A1* | 10/2007 | Appelman et al. | 709/204 |
| 2007/0282950 A1* | 12/2007 | Fischer et al. | 709/204 |
| 2008/0005240 A1* | 1/2008 | Knighton et al. | 709/204 |
| 2008/0021958 A1* | 1/2008 | Foote | 709/204 |
| 2008/0034040 A1* | 2/2008 | Wherry et al. | 709/204 |
| 2008/0196099 A1* | 8/2008 | Shastri | 726/12 |
| 2008/0256107 A1* | 10/2008 | Banga et al. | 709/204 |
| 2009/0106065 A1* | 4/2009 | Bowie et al. | 709/204 |

\* cited by examiner

```
<BOT INIT>
        <USER NAME>
            {bot userid}
312     </USER NAME>
        <PASSINFO>
            {bot authentication information}
        </PASSINFO>
</BOT INIT>

<BOT PERSONALITY>
        <CONVERSATIONS>
                {Sample conversation text to send to chat room -1}
                {Sample conversation text to send to chat room -2}
                ....
        404     {Sample conversation text to send to chat room -N}
                {Sample conversation text to send for offline mode}
                {Sample conversation text to send for online mode}
314
        </CONVERSATIONS>
        </RESPONSE PATTERNS>
                {Logic/Response to Selected pattern message in Chat room}
        406     {Logic/Response to Selected pattern message in Offline mode}
                {Logic/Response to Selected pattern message in Online mode}
        </RESPONSE PATTERNS>
        <ROOMTIME>
408             {time to spend in each chat room}
        </ROOMTIME>
</BOT PERSONALITY>

<INTEGRATION POINTS>
        <LINK ACCREHAB>
                {Account Rehabilitation/Deactivation integration point}
316     </LINK ACCREHAB>
        <LINK URLDB>
                {Spam/Phishing URL data store integration point}
        </LINK URLDB>
</INTEGRATION POINTS>
```

DYNAMIC COMBATTING OF SPAM AND PHISHING ATTACKS

TECHNICAL BACKGROUND

The present invention relates generally to computing security, and more particularly but not exclusively to dynamically combating spamming and other related abusive activities using computing robots configured to learn to probe for the abusive activities.

There is no question that that the explosive growth of the Internet in recent years has changed the way people communicate. For example, today, people are using email, Instant Messaging (IM), Short Messaging Services (SMS), chat rooms, and the like. Moreover, people are employing such communication messaging services on their laptops, and desktops, as well as their mobile phones.

With the increase in use of the Internet for communications has also come an increase in the use of mass marketing using email. This form of marketing has become an attractive advertising mechanism for individuals, businesses, and the like, because it enables them to reach a large audience at a minimal cost. Nevertheless, the use of email in this manner is often problematic for, and undesired by the recipients. Hence, a term, SPAM, has arisen to describe this type of useless or unsolicited email messages. Furthermore, similar unsolicited messages have recently migrated to IM, as SPIM.

In addition to these undesired messages, the internet has introduced many people to a type of fraud, known as phishing. Phishing typically involves the practice of obtaining confidential information through the manipulation of legitimate users. Typically, the confidential information is a user's password, credit card details, social security number, or other sensitive user information. Phishing may be carried out by masquerading as a trustworthy person, website, or business. In one approach, a message may be sent to an unsuspecting user. The message may include a link or other mechanism that links to an illegitimate source. In another approach, a webpage that may appear to be legitimate is provided to the user. However, the webpage (or message) is designed to trick the user into providing their confidential information. Such webpages (or messages) may relate to account log-in sites, credit card entry sites, or the like. Once the unsuspecting user enters their information, the phisher may be able to obtain the sensitive information and use it to create fake accounts in a victim's name, ruin the victim's credit, make purchases under the victim's name, sell the information to others, perform acts under the victim's identity, or even prevent the victim from accessing their own money and/or accounts.

Unfortunately, this type of fraudulent activity is becoming more popular, primarily because of how easy it is to convince people to divulge their sensitive information over the internet. Because victims to these attacks may reduce their activities over the internet with websites that have been phished, many legitimate businesses may also suffer both financially, and in their reputation.

Use of the internet becomes even more disconcerting when one considers the abuses within online chat rooms. A chat room is a way of communicating by sending, for example, text messages to others using a form of synchronous conferencing, or even occasionally asynchronous conferencing. Although many such chat rooms attempt to enforce a quality of behavior by its uses, many chat rooms remain a bastion for abuse, fraud, and potential phishing scams. Some chat rooms may also be unsafe for use by such individuals as children.

Thus, it is no surprise that such activities as SPAM, SPIM, phishing, and misuse of chat rooms have resulted in many people becoming more frustrated with their service providers. They expect their service providers, or others, to protect them from such abuses. Thus, it is with respect to these considerations, and others, that the present invention was made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein:

FIG. 4 illustrates one embodiment of pseudo-code for an NS Robot;

FIG. 6 illustrates a flow diagram generally showing one embodiment of an overview process for dynamically combating spam/spim/phishing attacks, or the like;

DETAILED DESCRIPTION OF THE INVENTION

Figure 1:
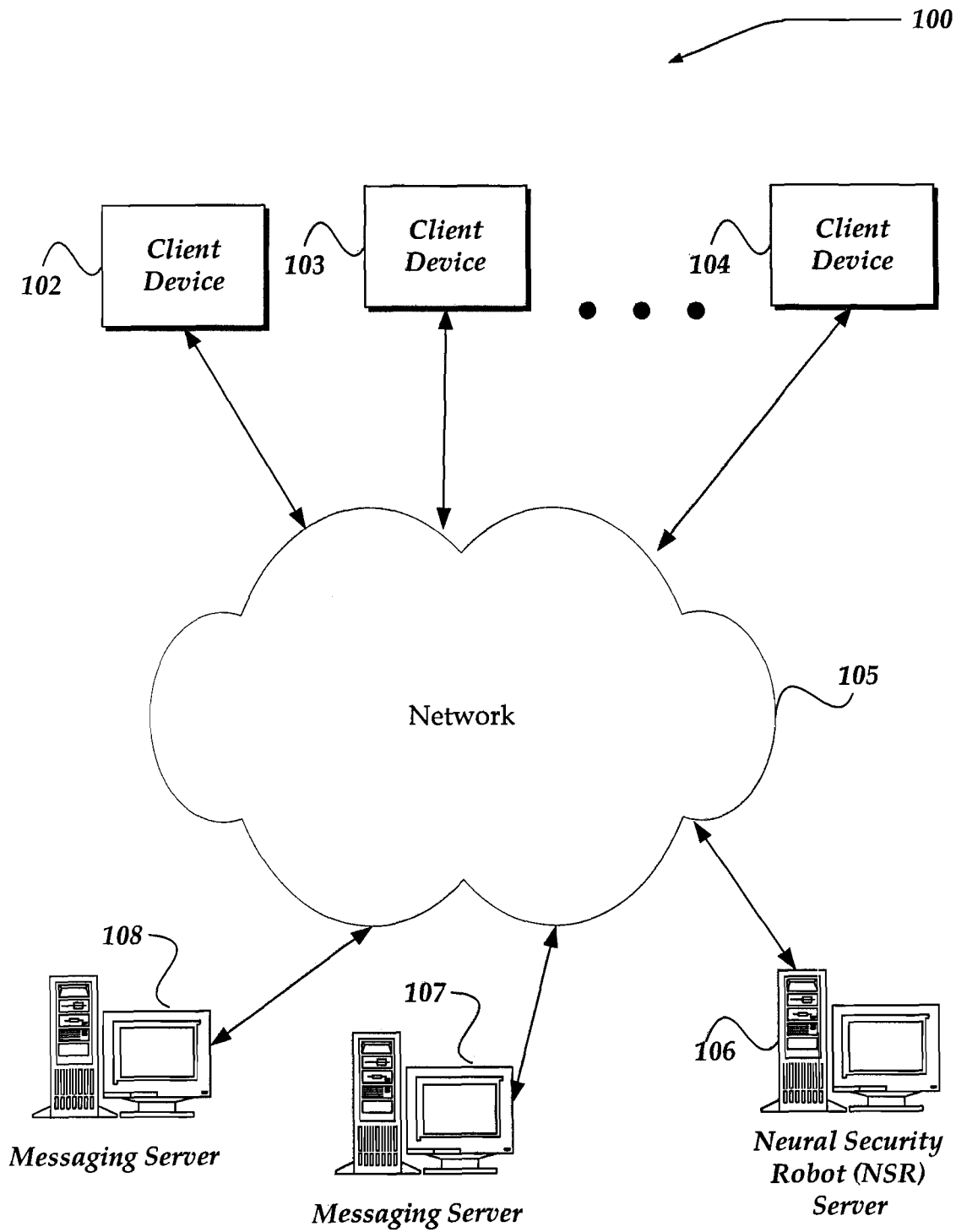
FIG. 1 shows a functional block diagram illustrating an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards a method, apparatus, and system for a self training set of robots (sometimes called "bots") that can be configured to proactively search for selective communication abuses over a network. The set of robots may be initially programmed to enter, in one embodiment, various chat rooms, or other messaging applications, to send and/or receive selective messages. The robots may then analyze the patterns and/or content of the received messages for potential abuse. In another embodiment, some robots may be initially programmed to passively reside on or off line, without publishing their network address. If a message is sent to these robots, the message may be interpreted to be SPAM/SPIM, or the like. In yet another configuration, some robots may be initially programmed to access a webpage, or perform another network related activity, that might acknowledge their presence on the internet. Any received messages may then be analyzed to determine if the messages indicate abuse of the network. Moreover, virtually any number or type of robot may be distributed over a variety of messaging applications to proactively, and/or passively monitor for communication abuses.

If an abuse is detected by at least one robot, additional information about the abuse may also be obtained, including, for example, a sender's network address, a sender's account name/address, Universal Resource Locators (URLs) associated with the abusive communication, or the like. Such information may be analyzed to confirm that the communication is an abuse, whether the sender has employed other mechanisms for abusive activities, a frequency of abuse, or the like. In one embodiment, messages from the abusive sender, URL, or the like, may be blocked, or otherwise filtered. In one embodiment, a warning might be sent to the sender. In another embodiment, the sender's account might be deactivated.

In addition, the information about the abuse, the sender, a domain address related to the abuse, a pattern associated with the abusive activities, or the like, may be used to retrain the robots, so that the robots may adapt to, or learn from, and share their collective knowledge of the abusive actions. Thus, in one embodiment, the invention may employ a neural network of robots that are configured to collect, store, analyze, and perform actions, including collectively sharing and learning from each other.

Although the embodiments are described within in terms of a client-server architecture, the invention is not so limited. For example, various embodiments may also employ a server to server, or even a peer to peer architecture, without departing from the scope of the invention.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, messaging servers 107-108, and Neural Security Robot (NSR) server 106. Client devices 102-104 are in communication with each other, messaging servers 107-108, and NSR server 106 through network 105. Messaging servers 107-108 and NSR server 106 may also be in communication with each other through network 105.

Client devices 102-104 may include virtually any computing device capable of receiving and sending a message over a network, such as network 105, to and from another computing device. The set of such devices described in an exemplary embodiment below generally includes mobile devices that are usually considered more specialized devices with limited capabilities and typically connect using a wireless communications medium such as cell phones, smart phones, pagers, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 105 is configured to couple client devices 102-104, with other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102-104, NSR server 106, and/or messaging servers 107-108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Messaging servers 107-108 includes virtually any network computing device that is configured to provide various resources, including content and/or messaging services over network 105. Messaging servers 107-108 may provide content and/or services for any of a variety of messaging applications, including, but not limited to SMS, MMS, IM, IRC, chat rooms, email, or the like.

In one embodiment, messaging servers 107-108 may also be configured to operate as a website server. However, messaging servers 107-108 may also operate as a File Transfer Protocol (FTP) server, a database server, content server, or the like. Additionally, each of messaging servers 107-108 may be configured to perform a different operation. Thus, for example, messaging server 107 may be configured as an IM messaging server, while messaging server 107 may be configured as an email server, a chat server, or the like. Moreover, while messaging servers 107-108 may operate as other than a website, they may still be enabled to receive an HTTP communication.

Devices that may operate as messaging servers 107-108 include, but are not limited to personal computers, desktop computers, multiprocessor systems, microprocessor-based or programmable consumer electronics, network PCs, servers, network appliances, and the like.

One embodiment of NSR server 106 is described in more detail below in conjunction with FIG. 2. Briefly, however, NSR server 106 includes virtually any network device that is configured to enable security robots to be generated, and deployed to collect information about possible communication's abuse. In one embodiment, NSR server 106 may generate one of more security robots that are developed to dynamically or proactively interact within a chat room, webpage, or other messaging application, including IM, SMS, email, or the like. Received responses to such interactions by the proactive robots may be analyzed to determine if the responses indicate abusive communications, such as SPAM, SPIM, phishing, or the like. NSR server 106 may also deploy a variety of other robots, including robots that may be configured to passively receive messages, while not advertising its network address.

NSR 106 may be further configured to receive information from the robots and to enable additional analysis to be performed to confirm, at least in part, whether the communications indicates abuse. If the communications indicate abuse, information about the sender, website, or the like, may be employed to deactivate an account, block or filter messages from the sender, or the like. In addition, the information may be employed to retrain the security robots, such that the robots may learn and share their collective knowledge regarding abusive communication patterns, sources, or the like. Moreover, in one embodiment, various robots may be deployed to collect information to detect abusive communications or other activities that may occur within a relatively short time frame (e.g., hours, minutes, or the like), or even long time frames, such as days, weeks, or even months. In one embodiment, NSR 106 may also store the collection as evidence of the abusive activities.

Devices that may operate as NSR 106 include, but are not limited to personal computers, desktop computers, multiprocessor systems, microprocessor-based or programmable consumer electronics, network PCs, servers, network appliances, and the like.

Although NSR server 106 and messaging servers 107-108 are illustrated as distinct network devices, the invention is not so limited. For example, a single network device may be configured to perform the operational aspects of NSR server 106 and messaging servers 107-108, or even a plurality of network devices may be configured such that the operational aspects of NSR server 106 and/or messaging servers 107-108 are distributed over the plurality of network devices.

Illustrative Server Environment

Figure 2:
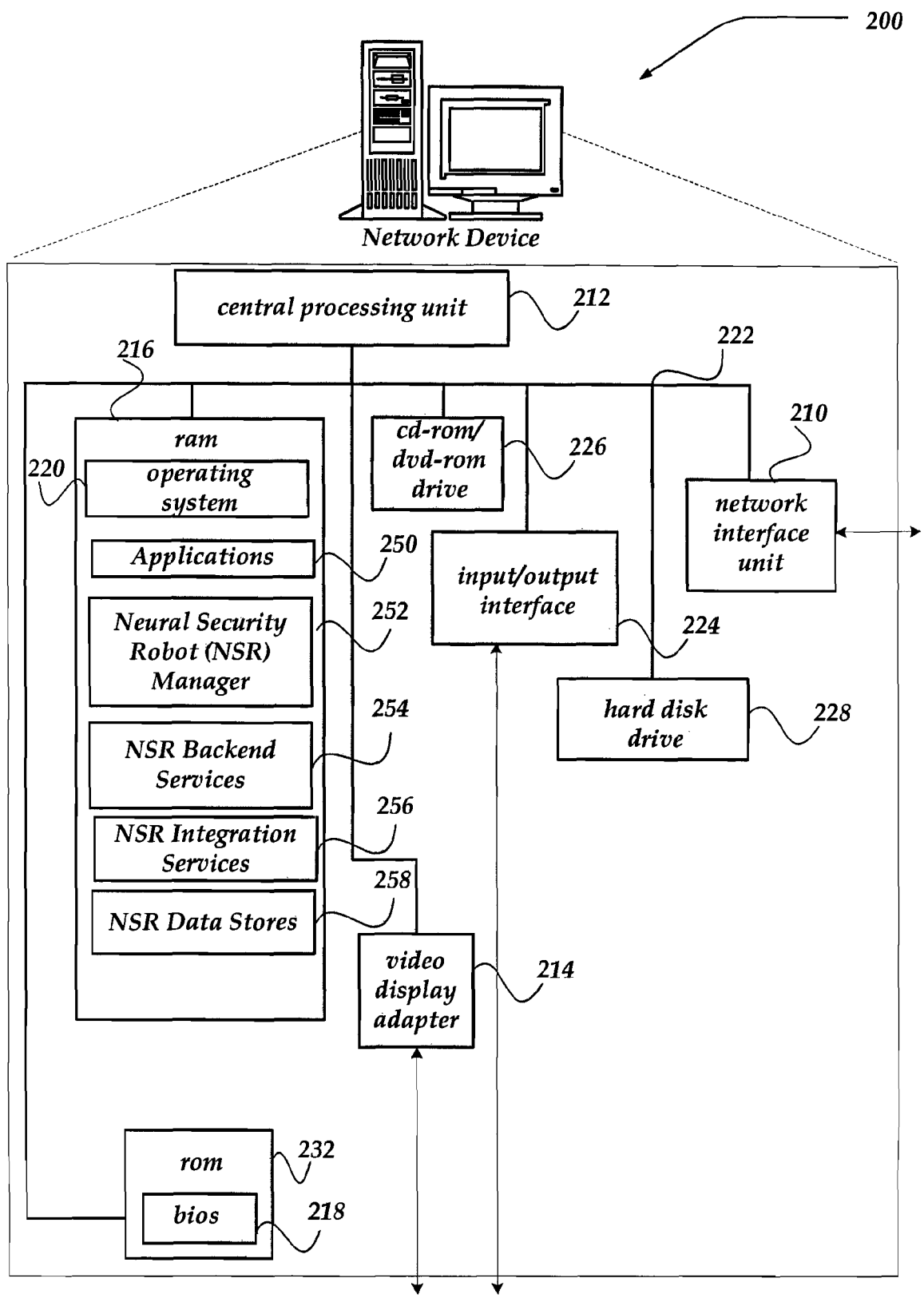
FIG. 2 shows one embodiment of a network device that may be employed.

FIG. 2 shows one embodiment of a network device, according to one embodiment of the invention. Network device 200 may include many more or less components than those shown. For example, network device 200 may operate as a network appliance without a display screen. The components shown, however, are sufficient to disclose an illustrative embodiment for practicing the invention. Network device 200 may, for example, represent NSR 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 is utilized by network device 200 to store, among other things, application programs, databases, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, security programs, web servers, and so forth. Mass storage may further include applications such as Neural Security Robot (NSR) manager 252, NSR backend services 254, and NSR Integration Services 256. Mass memory may also include NSR data stores 258.

Figure 3:
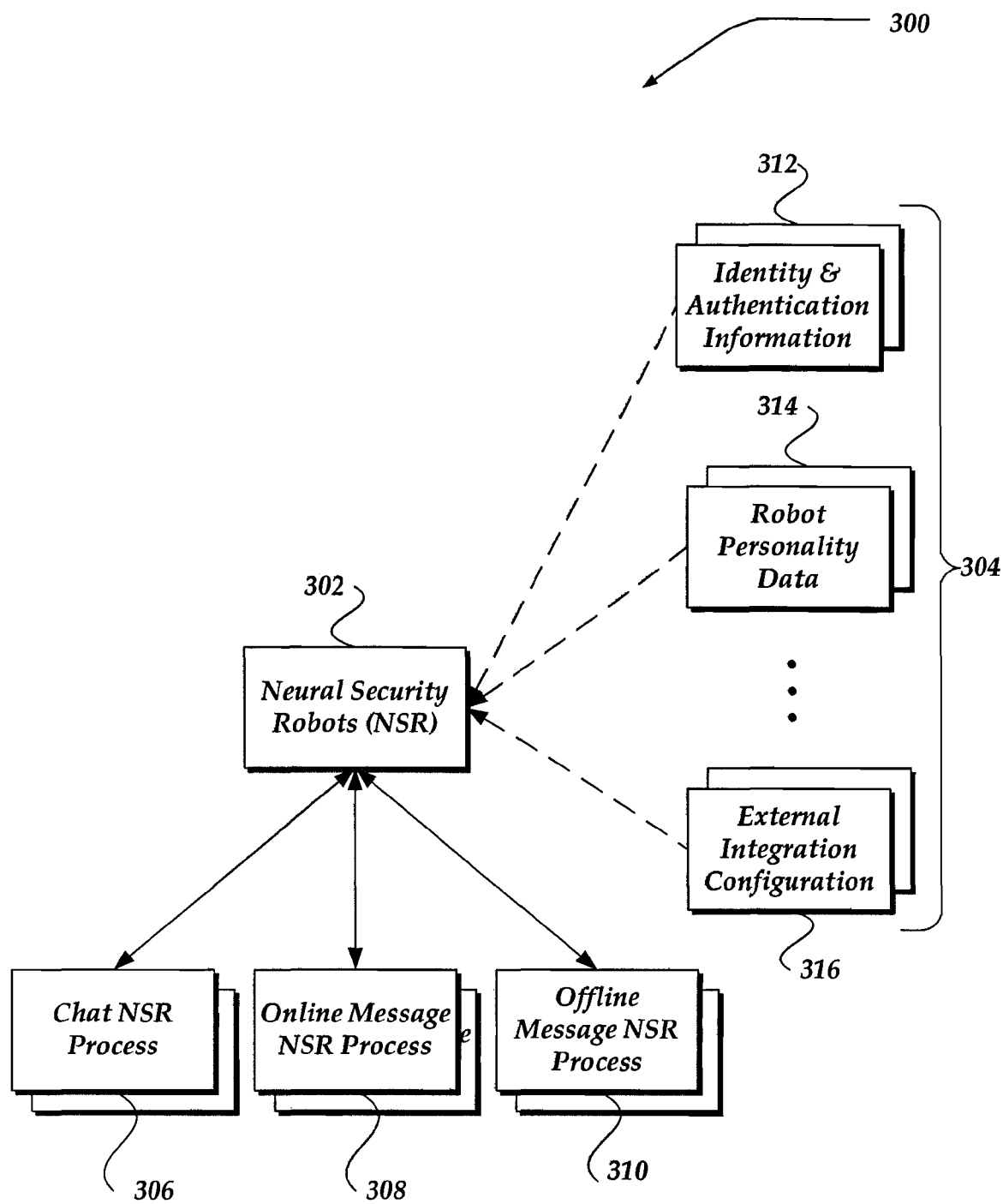
FIG. 3 shows a functional block diagram illustrating one embodiment of a Neural Security Robot (NSR) Architecture.
Figure 5:
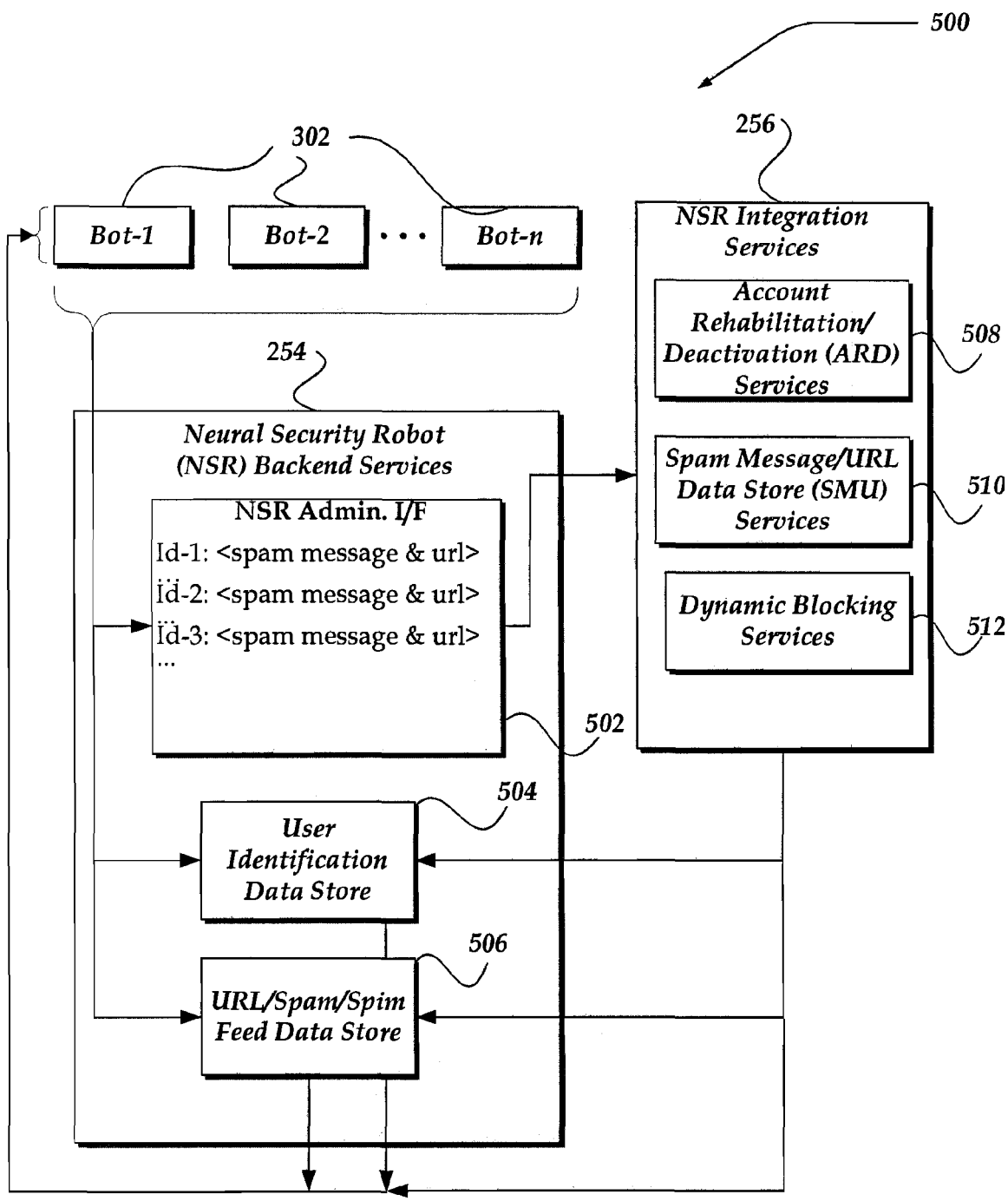
FIG. 5 shows a functional block diagram illustrating one embodiment of an NS Robot Interface Architecture.

NSR data stores 258 are configured to store and manage information about abusive communications. Thus, NSR data stores 258 may include, but is not limited to, user identifiers, network addresses, URLs, cookies, time of an abusive communications, a chat room or other messaging application in which an abusive communication is detected, a frequency of occurrence, and or other information. Thus, NSR data stores 258 may be implemented as a file, a folder, script, a program such as a database, spreadsheet, or the like. One embodiment of NSR data stores 258 is described in more detail below in conjunction with FIG. 5. As shown in FIG. 5, NSR data stores 258 may reside within NSR backend service 254. However, the invention is not so limited, and as shown in FIG. 3, NSR data stores 258 may reside separately from NSR backend services 254. Moreover, in another embodiment, NSR data stores 258 may also reside within hard disk drive 228, CD-ROM/DVD-ROM drive 226, or the like.

NSR Robot Manager 252 is configured to generate and deploy one or more robots for use in proactively and/or passively detecting and reporting an abusive communications. NSR Robot Manager 252 may further initiate, manage, and/or control a variety of other activities, including, but not limited to managing NSR Backend services 254, NSR Integration Services 256, and/or NSR data stores 258.

NSR backend services 254 are described in more detail below in conjunction with FIG. 5. Briefly, however, NSR backend services 254 are configured to provide an interface generator which may be run periodically, or upon request, to generate an integration point for communication with NSR integration services 256. In one embodiment, the interface generator may employ HTTP for communications. However, the invention is not so constrained, and other mechanisms may also be employed, including a script, program, or the like.

NSR backend services 254 may also manage retraining of robots based on information obtained by at least one robot, and/or further actions by NSR Integration services 256. NSR Integration Services 256 is described in more detail below in conjunction with FIG. 5. Briefly, however, NSR Integration Services 256 enables deactivation of accounts, blocking and/or filtering of abusive communications, web pages, or the like. NSR Integration Services may also be employed to provide feedback useable for retraining robots to use in detecting novel, and/or repeat abusive communications.

Illustrative Robot Architecture

FIG. 3 shows a functional block diagram illustrating one embodiment of a Neural Security Robot (NSR) Architecture 300. As shown, NSR architecture 300 includes a Neural Security (NS) Robot 302, which in turn may include one or more processes, including Chat NSR process 306, Online message NSR process 308, and/or Offline Message NSR process 310. NS Robot 302 may also include configuration information 304.

Briefly, NS Robot 302 includes virtually any computer program that is configured to automatically execute over a network and collect information associated with a communication's abuse. NS Robot 302 may be configured to communicate using a variety of communication protocols, including, but not limited to SMS, IM, email, HTTP, HTTPS, chat, or the like.

NS Robot 302 may be programmed, in one embodiment, to employ Chat NSR process 306 to crawl from one chat room to another chat room, and proactively detect abusive communications in a chat room. For example, in one embodiment, NS Robot 302, through Chat NSR process 306, may send selective messages within a chat room and listen for and/or receive responses to the messages. NS Robot 302 may analyze the responses to determine if they are abusive. In one embodiment, NS Robot 302, through Chat NSR process 306 may also passively monitor messages sent by other participants in a chat room, and determine if the monitored messages indicate abuse. NS Robot 302 may collect information about an abusive communications, a sender of the abusive message, or the like. For example, NS Robot 302 may collect a network address, account information, or the like, as well as the abusive message. NS Robot 302 may then send the collected information to another source, such as NSR backend services 254 of FIG. 2, for use in managing the abusive actions.

NS Robot 302 may also employ Online Message NSR process 308 and/or Offline Message NSR process 310 to monitor for other types of abusive communications, including email, IM, SMS, webpage abuses, or the like. For example, in one embodiment, NS Robot 302, through either Online Message NSR process 308 and/or Offline Message NSR process 310, may employ a previously deactivated identifier. NSR Robot 302 may also employ a more common identifier such as first name, such as bob, tom, peter, or the like. NSR Robot 302 may, in one embodiment, connect to a network, remaining offline, or go online. For example, in one embodiment, NSR Robot 302 may go online, by logging into an IM session, or go offline by entering an email program, or the like. However, the invention is not so constrained, and NSR Robot 302 may merely access a web page, or the like.

In any event, if NS Robot 302 receives a message within Online Message NSR process 308 and/or Offline Message NSR process 310, then it is likely that the message is SPAM/SPIM, or the like. NS Robot 302 may again gather information about the message, a URL within the message, the sender, or the like, for use in managing abusive communications. In one embodiment, the sender information may include a sender network address within a message header, an account identifier associated with the message, an alias, or any other obtainable information that may indicate a source of the message.

NS Robot 302 may also include configuration information 304 that may include identity & authentication information 312, robot personality data 314, and external integration configuration 316. Examples of each may be seen in FIG. 4, which represents one embodiment of configuration information 304 as pseudo code useable by NS Robot 302. It is important to note, however, that configuration information 304 may be implemented as scripts, applets, subroutines, programs, or the like, without departing from the scope of the invention.

Identity & authentication information 312 may include information about NS Robot 302, including its identifier for use on a network, and any authentication information such as a password, digital certificate or the like. In one embodiment, identity & authentication information 312 may also include information that uniquely identifies NS Robot 302 to NSR Manager 252 of FIG. 2. Such information may include a digital certificate, an encoded value, or the like.

Robot Personality data 314 may include such information as whether NS Robot 302 is configured to operate within a chat room, online, and/or offline, within an IM session, SMS session, email session, or other messaging application session. Moreover robot personality data 314 may include various messages that NS Robot 302 may send. For example, as shown in FIG. 4, conversations 404 may indicate selective messages to send while NS Robot 302 is within a specified chat room, online, or offline within another messaging application, including for example, email, IM, SMS, or the like.

Robot Personality data 314 may also include other information, such as a room time 408 indicating how long NS Robot 302 is to operate within a chat room, emailer, or other messaging application, and/or offline/online mode.

Similarly, FIG. 4 illustrates possible abuse example response pattern messages 406 for which NS Robot 302 may monitor. If such patterns are detected, NS Robot 302 may then provide collected information to a location that may be specified within external integration configuration 316. For example, as shown in FIG. 4, NS Robot 302 may provide account rehabilitation/deactivation data to one data store integration point, and/or spam/phishing data to another data store integration point.

It is important to recognize that NS Robot 302 is not constrained to merely configuration information 304, and other information may also be employed, including, for example, information about how long a robot is to live, what domains NS robot 302 is to move through, or the like.

Moreover, while configuration information 304 indicates that NS Robot 302 may operate within multiple communication modes, the invention is not so constrained. Thus, for example, a robot may be dedicated to a chat, a group of chats, or one or more particular messaging servers, websites, messaging applications, or the like.

FIG. 5 shows a functional block diagram illustrating one embodiment of an NS Robot Interface Architecture 500. As shown, architecture 500 includes NS robots (1-N) 302, NSR integration services 256, and NSR backend services 254.

NS robots 302 may be generated, retrained, and/or deleted based on a variety of criteria. For example, NS robots 302 may be generated to detect abusive communications within a particular domain, messaging application, chat room, or the like. Based on shared information, NS robots 302 may be retrained to detect similar abusive communications within another chat room, messaging application, domain, or the like. Similarly, NS robots 302 may have a lifespan in which to operate. Thus, for example, in one embodiment, NS robot 302 may be deleted after a predefined event, time period, or the like.

NS robots 302 may detect abusive communications, collect information about the abusive communications, and provide the collected information to NSR backend services 254.

NSR backend services 254 may include an NSR Administrative interface 502, user identification store 504, and/or a URL/SPAM/SPIM feed data store 506. In one embodiment, user identification store 504, and/or a URL/SPAM/SPIM feed data store 506 may reside within a same or different network device.

NSR Administrative interface 502 enables communications of various collected abuse information be sent to NSR integration services 256 for additional analysis and/or other actions. For example, in one embodiment, NSR administrative interface 502 may provide a report that includes a summary of a most frequently seen abusive URLs, sender identifiers, accounts, types of messages, or the like.

NSR Integration services 256 may include account rehabilitation/deactivation (ARD services 508. ARD services 508 may receive the collected abuse information, and determine which accounts should be deactivated. ARD services 508 may make this determination based on a variety of factors, including whether multiple robots have detected abusive communications from the sender, whether the type of abusive communications is of a nature that warrants deactivation, or the like. For example, sending a sales advertisement to one's friends might not be considered as abuse (especially if some percentage of them respond positively to the advertisement), while sending a sales advertisement to network addresses not within the sender's first or second degree of separation of addresses may be considered abusive. Degrees of separation may indicate that the two parties have a direct relationship, such as through direct email correspondences, inclusion of each other's email addresses within one's address book, or the like. Higher degrees of separation may indicate a further removed relationship, such as a friend of a friend, and the like. The present invention is not limited to degrees of separation, and other criteria may also be employed. In any event, if the selected criteria indicate deactivation, ARD services 508 may select to deactivate, purge, or otherwise delete an account. In one embodiment, ARD services 508 may also send a message to another service provider indicating such abusive communication, and requesting an action be taken. In another embodiment, ARD services 508 may also determine that the abusive communications detected are not sufficiently abusive to warrant deactivation. As such, ARD services 508 may, in one embodiment, select to have robots trained to continue monitoring the sender's activities, remove the sender's network address from user identification data store 504, or the like. In one embodiment, ARD services 508 may also send a warning message to the sender of the abusive communications. Moreover, in one embodiment, based on additional information, ARD services 508 may also be configured to enable reactivation of a deactivated network address, account, or the like.

Collected abuse information may also be provided to Spam Message/URL data store (SMU) services 510 of NSR integration services 256. In one embodiment, SMU services 510 may be configured to further analyze the received abuse information, employing similar actions and/or criteria as employed by ARD services 508. In one embodiment, SMU services 510 may perform such actions and/or analysis for SPAM/SPIM messages, URL addresses, or the like. In one embodiment, SMU 510 may send to dynamic blocking services 512 a SPAM/SPIM message, phishing message, a sender's address, a URL, or the like. Dynamic blocking services 512 may in turn dynamically configure a change to a filter, or the like, to monitor for and/or block a specified SPAM/SPIM message, phishing message, messages from a particular network address, access to or from a particular URL, or the like.

In addition, one or more components within NSR integration services 256 may provide information to or remove information from user identification data store 504 and/or URL/SPAM/SPIM feed data store 506. One or more components with NSR integration services 256 may also provide information useable to retrain and/or to generate robots. For example, where a particular abusive communications, or sender's address is observed with a particular messaging application, robots may be retrained and/or generated to monitor for similar abusive communications or the abusive sender's address within other messaging applications, including websites, or the like. Thus, in one embodiment, robots 302 may share their collective knowledge and learn to process information similar to a neural network.

In one embodiment, one or more components within NSR integration services 256 may include, at least during an initial learning phase, some administrator interaction. Thus, for example, in one embodiment, an administrator may receive a report from NSR Administrative interface 502, and perform an analysis upon the contents. In one embodiment, the initial learning phase may then be transitioned to reduce or even completely eliminate administrative interactions, and provide a completely automated system for detecting and managing abusive communications. However, the invention is not so limited. For example, in one embodiment, the entire process may be fully automated.

Generalized Operation

Figure 6:
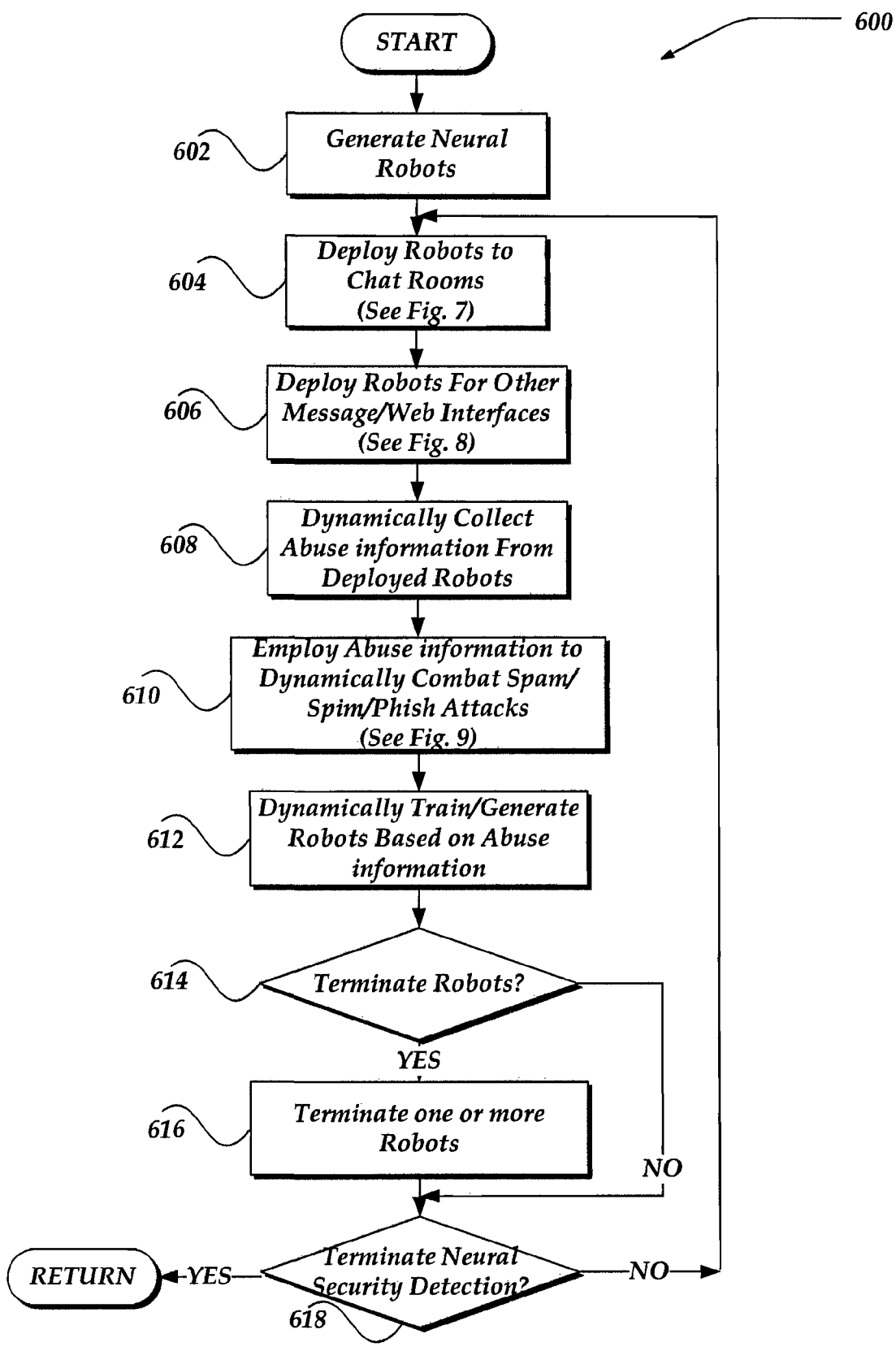

The operation of certain aspects of the invention will now be described with respect to FIGS. 6-9. FIG. 6 illustrates a flow diagram generally showing one embodiment of an overview process for dynamically combating SPAM/SPIM and/or phishing attacks, or other abusive communications. Process 600 of FIG. 6 may be implemented within various components of FIG. 5.

Process 600 begins, after a start block, at block 602, where one or more neural security (NS) robots may be generated. Generation of such robots may be performed by a script, by hand, or by another program. For example, a program may be created, that automatically generates various NS robots for use within one or more messaging applications. In one embodiment, the NS robots may be generated as applets, scripts, programs, or the like, using any of a variety of programming languages. In one embodiment, the NS robots may include components such as described above in conjunction with FIGS. 3-4. Moreover, an NS robot may have a defined lifespan based on an event, a time period, or the like.

Processing then proceeds to block 604, where, if an NS robot is generated for one or more chat rooms, the NS robot may be launched into the one more chat rooms. One embodiment of block 604 is described in more detail below in conjunction with FIG. 7.

Processing continues next to block 606, wherein one or more NS robots may be deployed to monitor one or more other message applications, web pages, URLs, domains, or the like. One embodiment, of block 606 is described in more detail below in conjunction with FIG. 8.

Process 600 flows next to block 608, where abuse information associated with potentially abusive accounts, sender's addresses, websites, messages, or the like, may be dynamically collected from one or more NS robots. Processing flows to block 610 which is described in more detail below in conjunction with FIG. 9. Briefly, however, at block 610, the abuse information may be employed to dynamically combat SPIM/SPAM, and/or phishing attacks, or other abusive communications, websites, or the like.

Processing continues to block 612, where the abuse information, and/or other information, potentially obtainable from block 610, may be employed to retrain, and/or generate robots. In one embodiment, the sharing of such abuse information enables the invention to operate similar to a neural network, where robots may learn and adapt based on the shared collective information. In one embodiment, the communications from the determined abusive sender's address, account, website, or the like, may be blocked, or otherwise filtered. Similarly, abusive messages may be filtered or otherwise blocked. Moreover, in one embodiment, an abusive sender's address or account may be deactivated.

Processing flows next to decision block 614, where a determination is made to terminate one or more NS robots. Determination to terminate an NS robot may be based on a time period associated with the NS robot, a type of analysis being performed by the NS robot, or the like. For example, in one embodiment, where the NS robot is generated to detect abusive communications within a particular chat room, but the chat room is removed from the network, or no chat communications have occurred for a defined period of time, then the NS robot might be terminated. In any event, if the NS robots are to be terminated, processing may flow to block 616, where the one or more NS robots may be deleted, or otherwise terminated. Processing then flows to decision block 618.

If, however, no NS robots are to be terminated, processing flows to decision block 618, where a determination is made whether the Neural Security detection and combating is to be terminated. If it is, processing returns to a calling process to perform other actions, including, for example, terminating all deployed NS robots, or the like. Otherwise if termination is not to be performed, processing may loop back to block 604 where the retrained and/or generated NS robots may be deployed.

Figure 7:
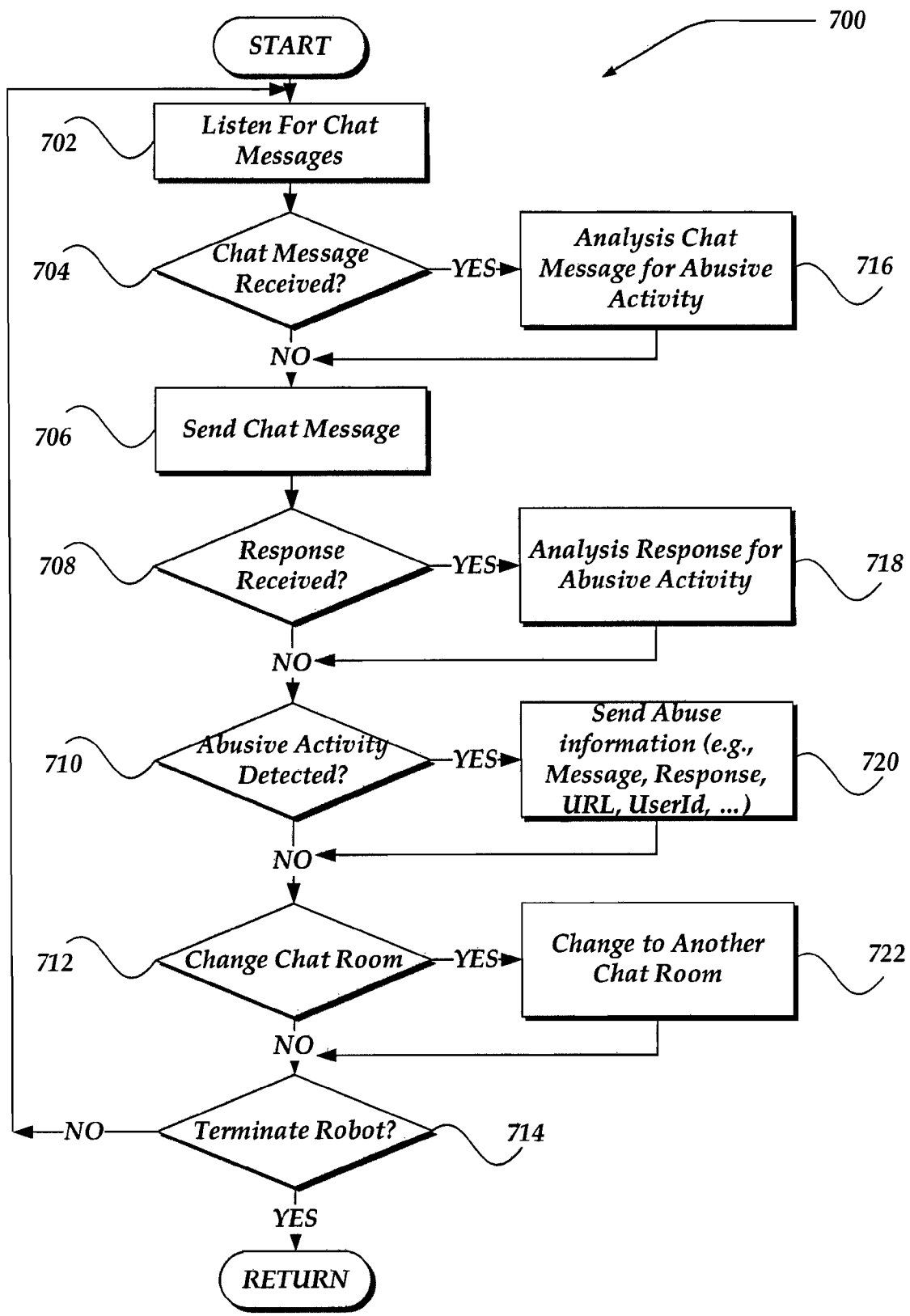
FIG. 7 illustrates a flow diagram generally showing one embodiment of an overview process for deploying NS Robots in a Chat Room.

FIG. 7 illustrates a flow diagram generally showing one embodiment of an overview process for deploying NS Robots in a Chat Room. Process 700 may, in one embodiment, represent actions within block 604 of FIG. 6.

Process 700 begins, after a start block, at block 702, where an NS robot that is deployed into a chat room may begin to listen for chat messages. Listening for a chat message may include, for example, listening for messages communicated between participants within the chat room.

Processing continues to decision block 704, where a determination is made whether a chat message is received. If a chat message is received, processing flows to block 716, wherein the received message is analyzed to determine if abusive activity is detected; otherwise, if no message is received, processing flows to block 706.

At block 716, such abusive activity may include communications associated with threats, unwanted solicitations, or the like. In one embodiment, the NS robot may compare received messages, format of the message, contents of the message, source of the message, or the like, to information within the NS robot's personality data, such as described above in conjunction with FIG. 4. In one embodiment, the NS robot may also collect information about a message, including a sender's network address, account, alias, date, time, embedded URLs, or the like, if the message is determined to be abusive. Processing flows to block 706.

At block 706, the NS robot may send a chat message, such as might be programmed within its personality data. Processing continues to decision block 708, where a determination is made if a response to the sent chat message is received. If no response is received, processing flows to decision block 710. However, if a response is received, processing branches to block 718, where the response may be analyzed based, in part, on the NS robot's personality data. If abusive communications is detected, additional information may be collected including the response, information about the sender, date, time, any embedded URLs, or the like. It should be noted that while blocks 706 and 708 illustrate a single chat message being sent, the invention is not so limited. For example, more than one chat message may be sent during block 706. Moreover, based on a type of response received, or whether no response is received, a different chat message may be sent, or a number of chat messages may be sent. In any event, processing then flows to decision block 710.

At decision block 710, a determination is made whether abusive activity or communications is detected. If abusive activity is detected, processing branches to block 720; otherwise, processing flows to decision block 712. At block 720, the collected abuse information may be sent to the backend services, as described above. In one embodiment, the sent information may be encrypted. In one embodiment, the sent information may further include an identifier associated with the sending NS robot. Processing then continues to decision block 712.

At decision block 712, a determination is made whether the NS robot is to change to another chat room. In one embodiment, a single NS robot may be configured to monitor several chat rooms; however, the invention is not so limited. For example, an NS robot may be specifically generated for a particular chat room, domain of chat rooms, or the like. In one embodiment, how long an NS robot remains within a chat room may vary based on whether it is detecting abusive activities. However, the NS robot may also be configured to leave a chat room based on a time period, or even some other criteria. In any event, if the NS robot is to change rooms, processing branches to block 722 where the NS robot moves to another chat room. Processing then flows to decision block 714. Otherwise, if the NS robot is not to change chat rooms, processing continues to decision block 714.

At decision block 714, at determination is made whether to terminate the NS robot. Termination may be based on a criterion, such as an event, a time, or the like. For example, the NS robot may be terminated if it does not detect an abusive activity within a given period of time. In any event, if the NS robot is to be terminated, the NS robot is deleted, or otherwise becomes inactive, and the processing returns to a calling process to perform other actions. Otherwise, if the NS robot is not to be terminated, processing may loop back to block 702 to continue monitoring for abusive communications or other activities.

Figure 8:
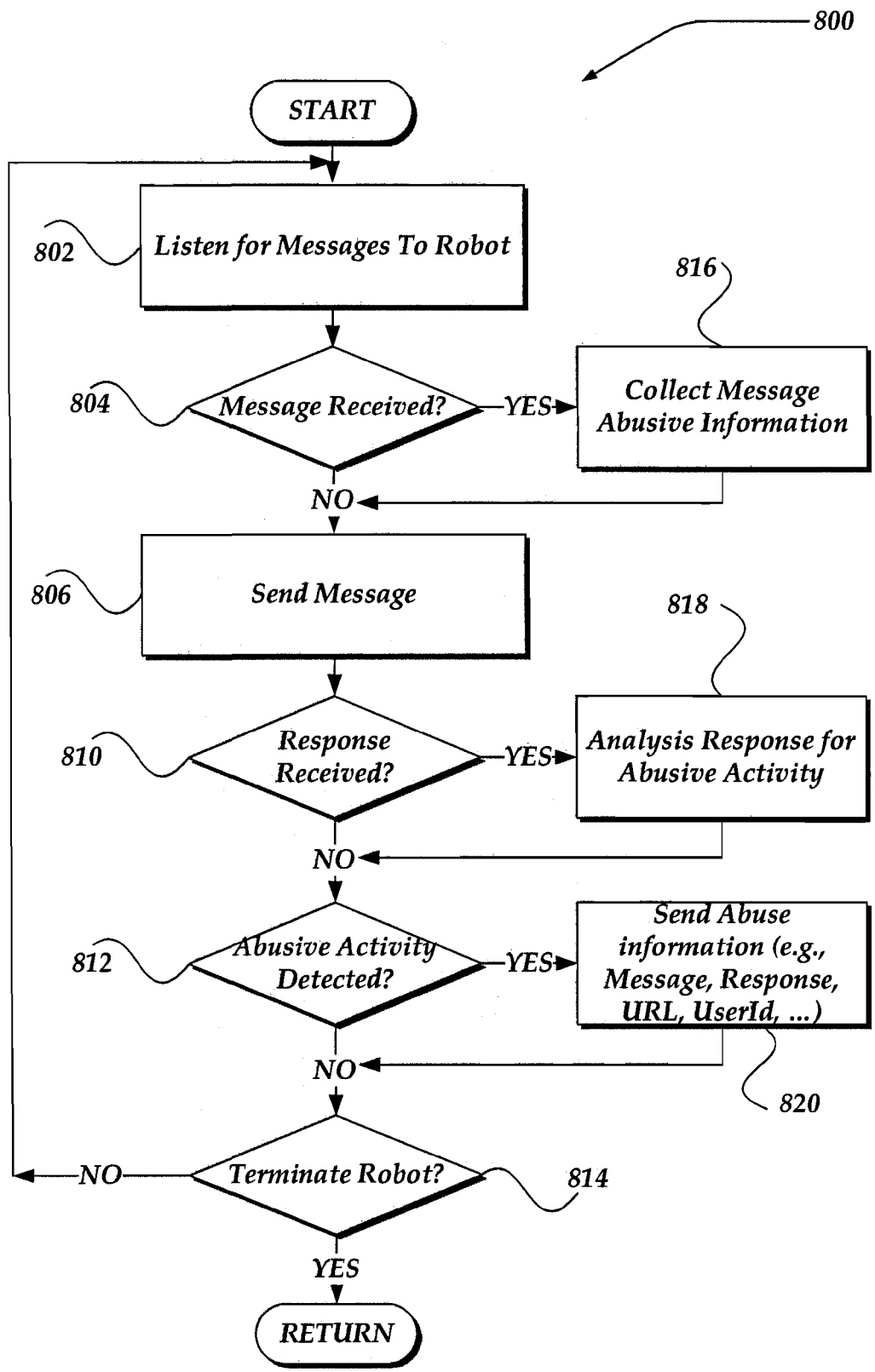
FIG. 8 illustrates a flow diagram generally showing one embodiment of an overview process for deploying NS Robots for Message/Web Communications.

FIG. 8 illustrates a flow diagram generally showing one embodiment of an overview process for deploying NS Robots for Message/Web Communications. In one embodiment, process 800 of FIG. 8 may be employed within block 606 of FIG. 6. However, other implementations may also be employed without departing from the scope of the invention.

Process 800 begins, after a start block, at block 802, when an NS robot goes offline or online within a specified messaging application. Similarly, in one embodiment, the NS robot may select to attempt to access a selected website. An NS robot may go online for example, by logging into an account and acknowledging its presence. Offline may include for example, logging into an account but not acknowledging its presence. In one embodiment, the NS robot may have an identifier that had been previously deactivated, or is otherwise out of date. As such, in one embodiment, the NS robot might not be expected to receive messages sent to it.

In any event, processing flows next to block 802, where the NS robot may listen for a message being sent specifically to it. In one embodiment, where the NS robot has not acknowledged its presence, but receives a message, it is likely that it is a SPAM/SPIM, a phishing message, or the like. This is because the NS robot should under normal, non-abusive conditions, not receive a message sent directly to it.

Processing flows next to decision block 804, where if an unexpected message is received, processing is directed to block 816; otherwise, processing flows to block 806. At block 816, the information about the unexpected message, including sender information, content, time, date, or the like, is collected as abusive information. Processing then flows to block 806.

At block 806, the NS robot may send a message over the specified messaging application. In one embodiment, where the messaging application includes a website, the NS robot may select to provide selected information to the website, such as an alias, a network address, or the like. In any event, the send message, or other information provided may be programmed, in one embodiment, into the NS robot within its personality data, as described above. Processing then flows to decision block 810, where a determination is made whether a response is received to the sent message, provided information, or the like. If a response is received, processing branches to block 818; otherwise, processing flows to decision block 812.

At block 818, the received message may be analyzed to determine whether abusive communications or other activity is detected. In addition, additional information about the abuse communications or activity may be collected, including, but not limited to a URL, the message received, sender information, or the like. Processing then continues to decision block 812.

At decision block 812, a determination is made whether abusive communications or other activity is detected. If it is, processing branches to block 820; otherwise, processing flows to decision block 814. At block 820, the NS robot may send the collected abuse information to a backend service such as described above. In one embodiment, the sent information may be encrypted. In one embodiment, the sent information may further include an identifier associated with the sending NS robot. Processing then flows to decision block 814.

At decision block 814 a determination is made whether the NS robot is to be terminated. Termination may be based on a variety of criteria, including, but not limited to an event, a time, or the like. For example, if the NS robot does not detect abusive activity within a given period of time, the NS robot may be terminated. In any event, if the NS robot is to be terminated, it may be deactivated, deleted, or the like, and processing then returns to a calling process to perform other actions. Otherwise, if the NS robot is not to be terminated, processing loops back to block 802.

Figure 9:
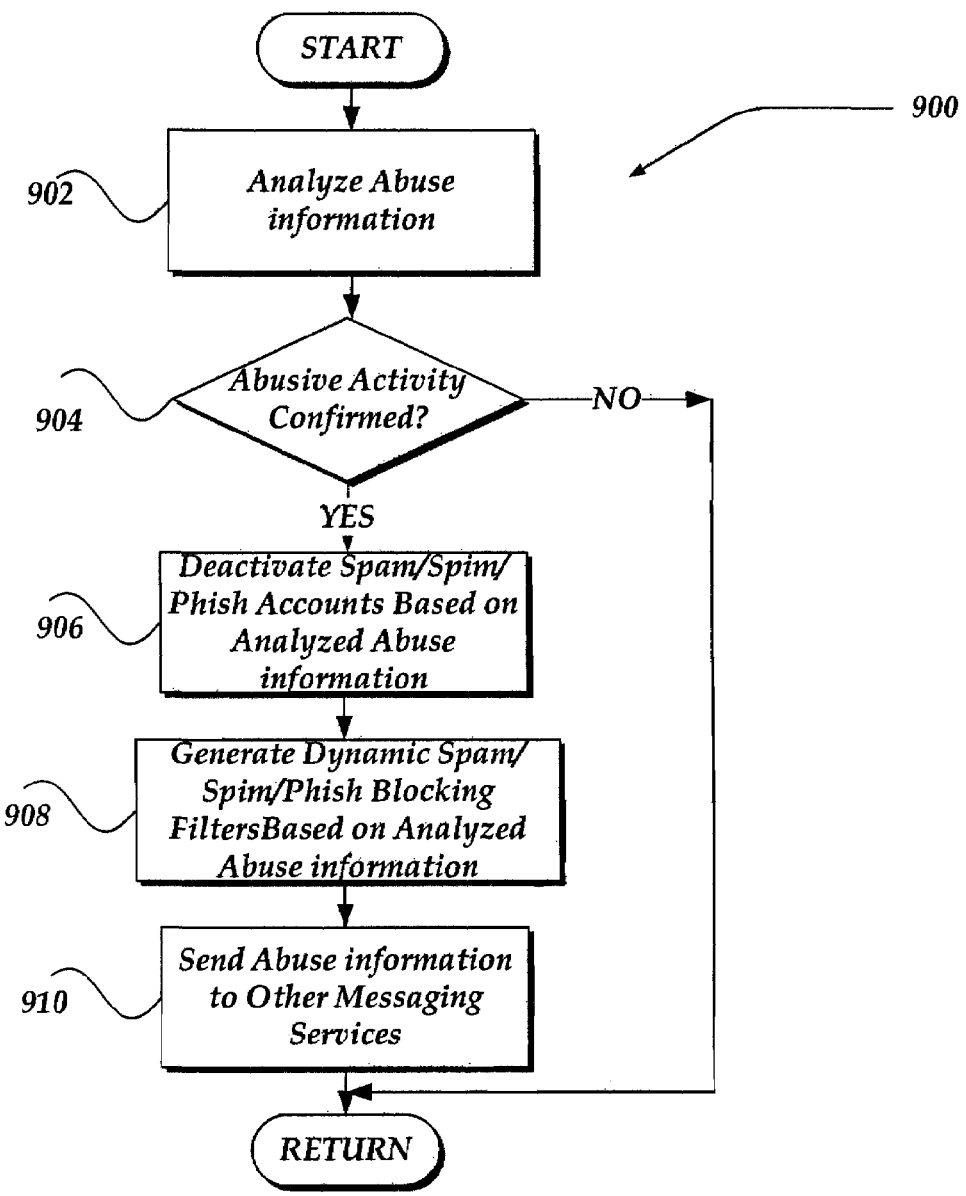
FIG. 9 illustrates a flow diagram generally showing one embodiment of an overview process for dynamically combating abusive communications and/or other activities using NS Robot collected abuse information, in accordance with the invention.

FIG. 9 illustrates a flow diagram generally showing one embodiment of an overview process for dynamically combating abusive communications and/or other activities using NS Robot collected abuse information. Process 900 of FIG. 9 may represent one embodiment of an implementation of block 610 of FIG. 6. Moreover, in one embodiment, process 900 may be performed by NSR integration service 256 of FIG. 5, for example.

Process 900 begins, after a start block, at block 902, where received abuse information may be further analyzed, beyond the initial analysis performed by a sending NS robot. Such additional analysis may represent information obtained, but not yet fed back to the NS robots, a review by an administrator, or the like. Processing then flows to decision block 904, where a determination is made whether abusive communications or other activity is confirmed to be present. If not, processing returns to a calling process to perform other actions, such as retraining the NS robots, or the like. However, if it is confirmed that abusive communications or other activities are detected, processing flows to block 906.

At block 906, the abusive information may be employed to deactivate a sender's account, network address, or the like. Processing continues to block 908, where blocking filters, or the like, may be revised to block or otherwise prevent access to and/or by the sender, website, messages from the sender, web site, or the like. Processing continues next to block 910, where the abusive information may be shared with other messaging services to enable them to also block or otherwise prevent messages from or access by the abusive entity (sender, website, or the like). Processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for detecting an abusive activity over a network, comprising:
   a first computer robot (bot) that is configured to perform actions, including:
      proactively sending a first message in a chat room;
      receiving a response to the first message; and
      if the response indicates an abusive activity in the chat room, determining a source of the response, and transmitting the response and the determined source of the response over the network;
   a second computer robot that is configured to perform actions, including:
      changing a status for the second computer robot to offline within the chat room without advertising an account identifier that uniquely identifies the second computer robot to the first computer robot such that a presence of the second computer robot is unacknowledged in the chat room;
      listening by the second computer robot for a second message; and
      if the second message is received by the second computer robot at the unadvertised account identifier, identifying the second message as an abusive message; and
   a network device that is configured to perform actions, including:
      receiving the response and the determined source of the response;
      dynamically revising a filter to block another message based on the response or the determined source; and
      dynamically retraining the first computer robot based, in part, on the response, the determined source, and information from the blocking filter, and the second computer robot, such that the first computer robot learns and adapts based on shared collective information.

2. The system of claim 1, wherein the first computer robot is further configured to send another message in a different online messaging application, comprising at least one of an instant messaging, Short Messaging Service, or email.

3. The system of claim 2, wherein the first computer robot is further configured to perform actions, including:
   if the response to the other message indicates an abusive activity in the different messaging application, determining a source of the response to the other message, and transmitting the response and the determined source to the network device.

4. The system of claim 1, wherein the second computer robot employs a previously deactivated identifier.

5. The system of claim 4, the second computer robot being configured to perform actions, further comprising:
   sending the determined source of the second message to the network device, wherein the network device is further configured to dynamically revise the filter to block messages from the determined source of the second message, and to dynamically retrain at least one robot based on information associated with the second message.

6. The system of claim 1, wherein the network device further comprises an integration service for use in deactivating an account, or revising a filter to block messages.

7. The system of claim 1, wherein the first computer robot further comprises at least one of a chat process, an offline messaging process, or an online messaging process.

8. A non-transitory, processor readable storage medium having computer-executable instructions, wherein the execution of the computer-executable instructions provides for detecting an abusive activity by enabling actions, including:
   generating at least one first robot that is configured to proactively send a first message within a chat room, to receive and to analyze a response to the first message, and if the response indicates an abusive activity, determining a source of the response;
   receiving the response, and the determined source of the response, from the at least one first robot;
   generating at least one second robot that is configured to perform actions, including:

changing a status for the at least one second robot within the chat room such that the at least one second robot does not advertise an account identifier that uniquely identifies the at least one second robot to the at least one first robot such that a presence of the at least one second robot within the chat room is unacknowledged;

listening for a message sent to the unadvertised account identifier, absent sending a message by the at least one second robot; and when a message is detected that is sent to the unadvertised account identifier, identifying the message sent to the unadvertised account identifier as an abusive message;

dynamically revising a filter to block another message based on the determined source or the response; and dynamically training the at least one first robot and the at least one second robot based on the response and the determined source, and information about the revised filter, such that the at least one first robot and the at least one second robot learn and adapt based on shared collective information.

9. The non-transitory, processor readable storage medium of claim 8, wherein dynamically training the at least one first robot, further comprises, configuring the at least one first robot to monitor for abusive activity in a different messaging application, based on the response or the determined source.

10. The non-transitory, processor readable storage medium of claim 8, wherein the at least one first robot is further configured to move from the chat room to another chat room and to further proactively send another message within the other chat room to detect abusive activity in the other chat room.

11. The non-transitory, processor readable storage medium of claim 8, wherein the at least one first robot is further configured to move to another messaging application, and without advertising an account identifier, listening for another message sent to the at least one first robot.

12. The non-transitory, processor readable storage medium of claim 11, wherein the at least one first robot, if further configured such that if the other message is received in the other messaging application, identifying the other message as an abusive activity.

13. The non-transitory, processor readable storage medium of claim 8, wherein at least one robot is configured to be deactivated based on at least one of a time period being exceeded, or a condition being satisfied.

14. A method in a first computer robot for detecting abusive activity within a messaging application over a network, operating within at least one computer network device and that performs actions comprising:

deploying passively within a first messaging application, without advertising an account identifier that uniquely identifies the first computer robot to at least a second computer robot such that a presence of the first computer robot within the message application is unacknowledged in the first messaging application;

listening for a message directed to the first computer robot, absent sending of a message within the message application;

if a message is received within the first messaging application, directed to the unadvertised first computer robot's account identifier:
 identifying the message as abusive activity;
 determining a source of the message; and
 providing the message, and the determined source of the message to a network device for use in filtering another message from the determined source, and to further train the first computer robot based on shared collective information from a plurality of computer robots, such that the first computer robot is enabled to monitor for another message from the determined source in a second messaging application.

15. The method in the first computer robot of claim 14, further comprising:
 logging into a chat room;
 proactively sending a chat message within the chat room;
 receiving a response to the chat message; and
 if the response to the chat message indicates abusive activity:
  determining a source of the response to the chat message, and
  providing the response to the chat message, and the determined source to the network device for use in filtering another message from the determined source of the response to the chat message.

16. The method in the first computer robot of claim 15, wherein the first computer robot is configured to log into a different chat room and to proactively send another chat message.

17. The method in the first computer robot of claim 14, wherein the first computer robot is further configured to become deactivated based in part on satisfaction of a time period or an event.

18. A method, operating within at least one computer network device, of detecting an abusive activity over a network within a messaging application, comprising:

generating a first computer robot that is configured to proactively send a first message within a first messaging application, to receive and to analyze a response to the first message, and if the response indicates an abusive activity, determining a source of the response;

generating a second computer robot that is configured to perform actions, including:
 logging the second computer robot into an account for the first messaging application without advertising an account identifier that uniquely identifies the second computer robot to the first computer robot such that a presence of the second computer robot is unacknowledged on the network within the first messaging application;
 listening by the second computer robot for a second message; and
 if the second message is received by the second computer robot at the unadvertised account identifier, identifying the second message as an abusive message, and further determining a second source for the second message;

dynamically revising a filter to block another message from the determined source or based on the response and further revising the filter to block another message from the second source; and dynamically training the first computer robot based on the response, the determined source, and second source such that the first computer robot learns and adapts based on shared collective information, such that the first computer robot is enabled to detect another abusive activity based, in part, on the response or the determined source in another messaging application.

19. The method of claim 18, wherein the first messaging application is at least one of a chat room, a website, instant messaging, short messaging service, or email.

20. The method of claim 18, wherein the method is embodied in computer executable instructions stored within a portable computer-readable storage device.

* * * * *